United States Patent Office 2,694,143
Patented Nov. 9, 1954

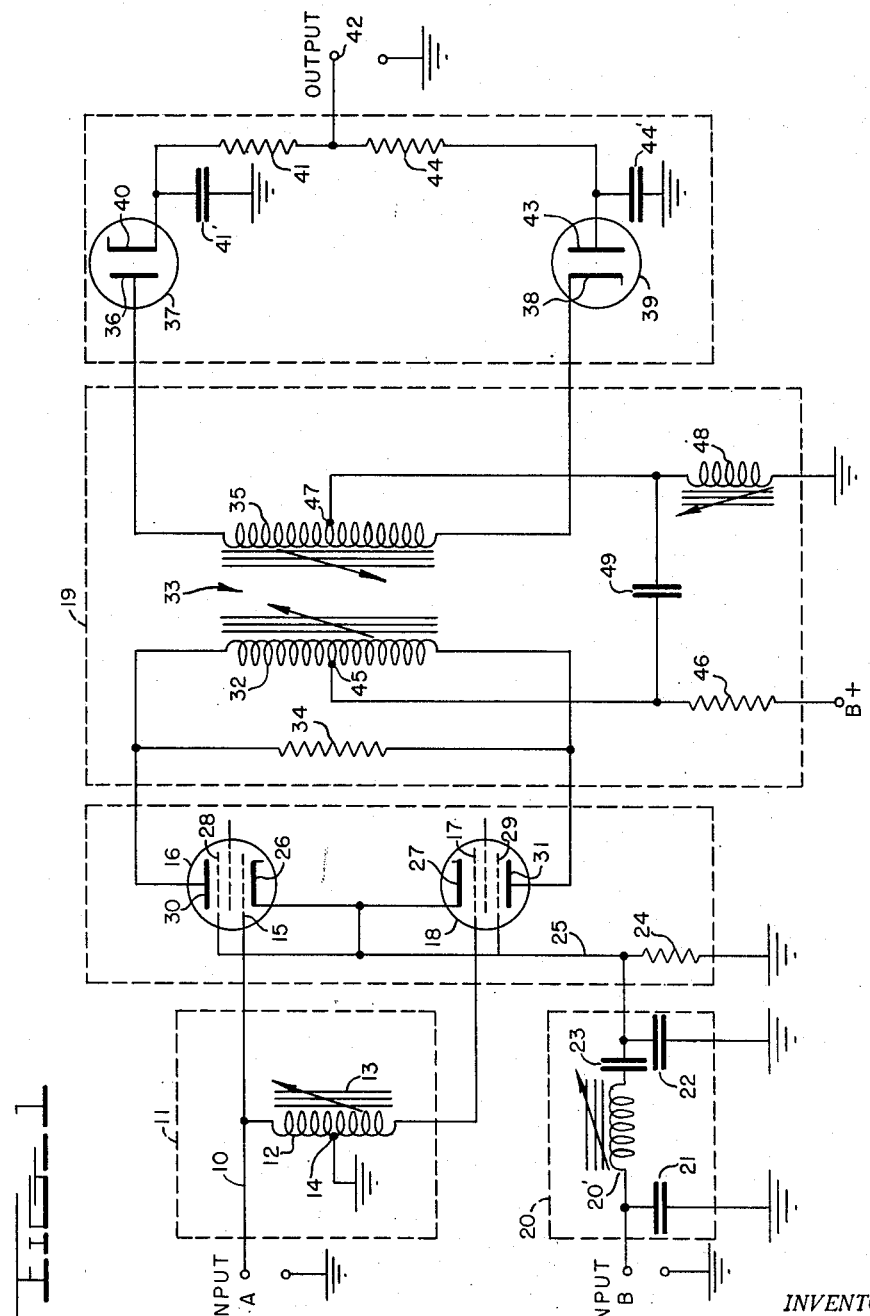

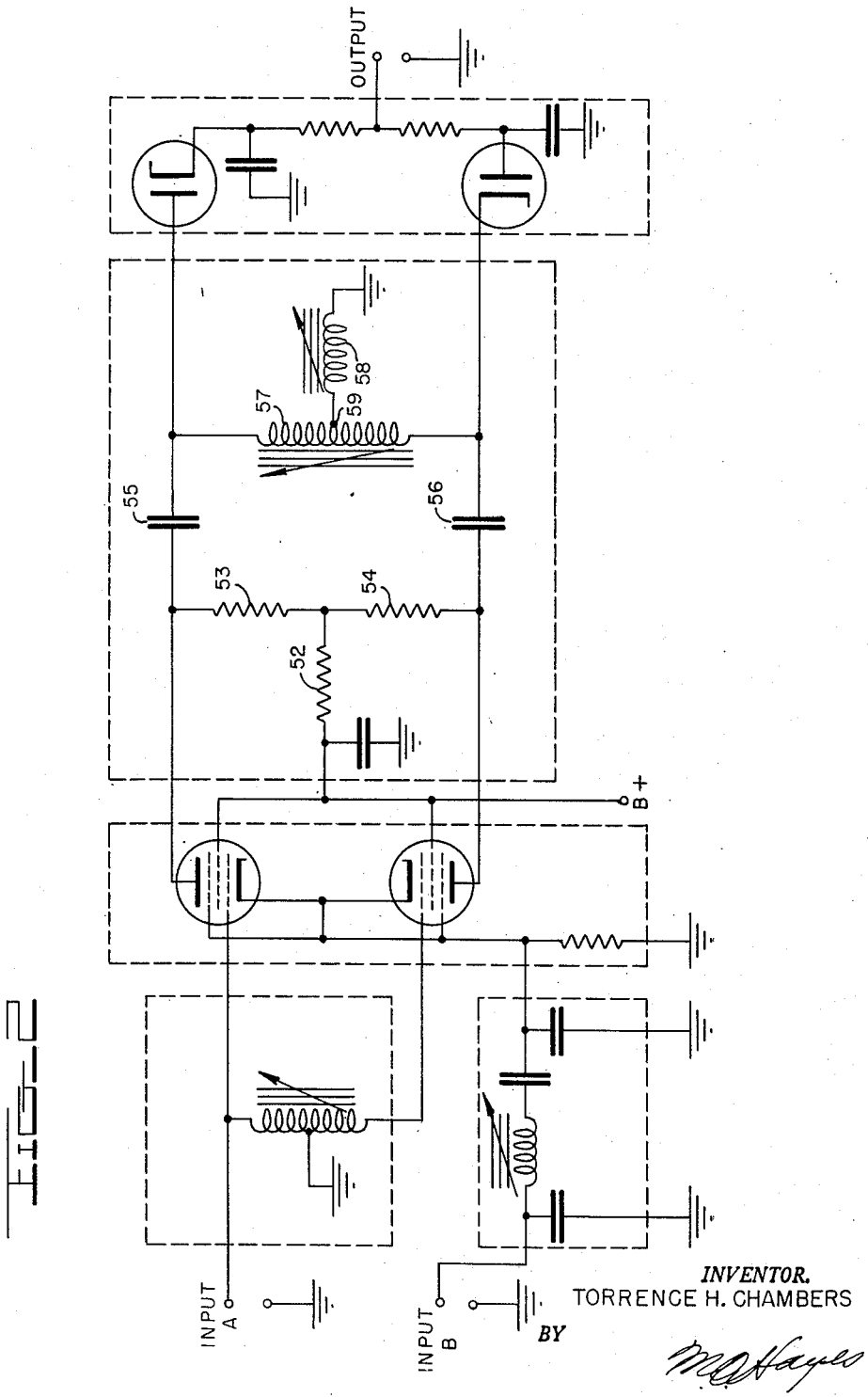

2,694,143

BALANCED PHASE DETECTOR

Torrence H. Chambers, Washington, D. C.

Application November 12, 1948, Serial No. 59,734

3 Claims. (Cl. 250—27)

This invention relates to phase detectors receptive to signals of different phase and operative to generate an output indicative of the amount of phase difference between the input signals.

Phase detectors commonly include vacuum tube means for mixing the signals to be compared in phase, a tunable output circuit for the vacuum tube means and rectifier means for obtaining a D.-C. voltage indicative of the difference in phase of the mixed signals. Phase detectors give an erroneous indication when one of the input signals varies in amplitude. To obviate this difficulty, balanced phase detectors have been employed which cancel out the effects of amplitude changes. One such circuit of the prior art is shown on page 667 of the book, "Radar System Engineering," edited by Louis N. Ridenour and published by McGraw-Hill Book Co. in 1947.

While this system of the prior art is generally satisfactory, it has proved to be very difficult to tune for operation at maximum efficiency. The balanced form of the circuit for cancelling out the effects of amplitude changes requires that there be two tuned circuits on the output side of the mixer tubes, one for each of the input signals. However, the circuits of the prior art are such that some of the elements are common to both circuits and adjustments of the tuning means of one circuit affects the tuning of the other circuit. The interaction between the two tuning means makes the proper tuning of the circuits very difficult. It is therefore a general object of this invention to provide a balanced phase detector having tuned circuits with separate tuning means, each of which may be individually adjusted without affecting the tuning of the other circuit.

It is another object to provide a balanced phase detector providing an accurate output indication regardless of variations in amplitude of one of the input signals.

While the balanced phase detector of the present invention may be employed in a great many ways, as will be apparent to those skilled in the art, it is particularly adapted for use in a moving target indication type of radar system. In such a system, received echo signals are compared in a phase detector circuit with a signal having the same phase as the transmitted pulse. Echo signals from moving objects differ in phase from the transmitted pulse because of the phenomenon known as the doppler effect. The difference in phase is employed to discriminate between stationary and moving objects. The phase detector in such systems is receptive to received echo signals and a reference signal, usually generated by a coherent oscillator in synchronism with the transmitted pulse. The phase detector requires relatively broad band tuning for the echo signal and narrow tuning for the reference signal. It is therefore a further object of the present invention to provide a balanced phase detector having a broadly tuned circuit for one signal and a narrowly tuned circuit for the other signal.

In pursuance of these and other objects which will be apparent to those skilled in the art, a pair of vacuum tubes is provided receptive in push-pull to one of the signals and receptive in parallel to the other signal. A balanced output circuit includes independently adjustable tuning means for the two signals and back-to-back rectifiers for detecting the mixed signals. A centertapped load resistor is connected to the rectifiers, the voltage at the centertap being a D.-C. quantity representative of the difference in phase of the input signals.

For a better understanding of the invention, reference is had to the following description of two embodiments of the invention taken with the appended drawings wherein:

Figure 1 is a circuit diagram of a presently preferred form of the invention, and Figure 2 is a circuit diagram of another embodiment of the invention.

Referring now in greater detail to the drawings, input A is applied through wire 10 to a tuning and phase splitting circuit designated 11 having a coil 12 and an adjustable powdered iron tuning slug 13. The coil 12 is centertapped at 14 and connected to ground. The top end of coil 12 is connected to the control grid 15 of vacuum tube 16. The bottom end of coil 12 is connected to the control grid 17 of vacuum tube 18. Because of the grounded centertap 14, the voltages at the ends of coil 12 are 180 degrees out of phase and these voltages are applied to the vacuum tubes 16 and 18, having output circuit 19, in what is commonly known as a push-pull arrangement.

Input B is applied to a tuning and matching circuit 20 including variable inductor 20' and capacitors 21 and 22. Capacitor 23 is for D.-C. blocking and resistor 24 is for cathode biasing. The output of the tuning and matching circuit is applied through wire 25 in parallel to the cathodes, 26 and 27 of the tubes 16 and 18, respectively. The suppressor grids 28 and 29 are tied to the cathodes in accordance with conventional practice.

The vacuum tubes 16 and 18 are connected to output circuit 19 having two interconnected but electrically independent transformers, one for signal A and one for signal B. Plate 30 of tube 16 and plate 31 of tube 18 are connected to opposite ends of the primary coil 32 of a coupling transformer, generally designated 33, designed to accommodate signal A. A load resistor 34 is connected between the plates 30 and 31. One end of the secondary coil 35 of transformer 33 is connected to the plate 36 of diode 37 and the other end is connected to the cathode 38 of another diode 39. The cathode 40 of diode 37 is connected through condenser 41' to ground and through load resistor 41 to the output terminal 42; and the plate 43 of diode 39 is connected through condenser 44' to ground and through load resistor 44 to the output terminal 42. Resistors 41 and 44 are equal in value and therefore may be looked at as a single centertapped resistor.

The centerpoint 45 of primary coil 32 is connected through a load resistor 46 to positive B voltage. The centerpoint 47 of secondary coil 35 is connected through a variable tuning inductor 48, designed to accommodate signal B, to ground. A capacitor 49 provides a path between the centerpoints 45 and 47 for R.-F. voltages and isolates the points for D.-C. voltages.

As is apparent from the drawing, the circuit is arranged in push-pull so far as signal A is concerned and in parallel so far as signal B is concerned.

The operation of the circuit shown in Figure 1 is as follows:

One signal A is applied to the tuning and phase splitting circuit 11 from which components of the signal having 180 degree phase relationship are applied in push-pull to the grids 15 and 17 of the vacuum tubes 16 and 18. Another signal B is applied through the tuning and matching circuit 20 in parallel to the cathodes 26 and 27 of the vacuum tubes 16 and 18. The plate current resulting from signal A circulates in coil 32 and load resistor 34 of the output circuit, the circuit being tunable by adjustment of the powdered iron cores of the coupling transformer 33. The plate current resulting from signal B flows in balance to the centertap 47 and thence through the variable inductor 48 to the ground return. It is to be noted that coils 32 and 35 are preferably designed to have as close to unity coupling between their respective ends as possible so that the B signal in flowing through coils 32 and 35 to centertaps 45 and 47 will encounter negligible impedance. The circuit is tuned for signal B by adjusting the core of inductor 48. By virtue of the balanced nature of the circuit, the tuning of coupling transformer 33 for the A signal has no effect on the tuning of the circuit for the B signal. Likewise, the tuning of inductor 48 for the B signal has no effect on the tuning of the circuit for the A signal. Tuning of the circuit for the two signals is greatly simplified by the balanced arrangement which eliminates interaction between the tuning elements. The designs of the double tuned transformer 33 for the A signal and the single tuned inductor 48 for the B signal are arrived at independently by methods well known to the art. The design of one transformer does not affect the design of the other.

The resonant circuits of inductors 32, 35 and 48 include stray distributed capacitances in the system. It will be noted that the coupling transformer 33 provides broad band tuning for the A signal and the inductor 48 provides narrow band tuning for the B signal. When the balanced phase detector is used in a moving target indication radar system, the echo signal is applied to input A because broad band tuning is required. The reference signal is applied to input B as narrow band tuning is appropriate. It is to be understood, however, that the present invention may employ broad band tuning for one, or the other, or both, or neither of the signals in accordance with the characteristics of the signals being compared in phase.

The mixed R.-F. signals in the secondary coil 35 are applied to the back-to-back rectifiers 37 and 39 and to resistors 41 and 44, all of the detector circuit. The voltage developed at the output 42 between the resistors 41 and 44 is a D.-C. voltage corresponding with the envelope of the mixed signals and having an amplitude which is a function of the difference in phase of the input signals.

It will be noted that when signal B alone is applied to the balanced phase detector, there is no D.-C. voltage generated at the output 42 because equal and opposite voltages are developed across resistors 41 and 44. In view of this fact it is apparent that variations in amplitude of signal B, when signal A is also applied to the balanced phase detector, cannot affect the output indication of phase difference between the two signals. A balanced circuit arrangement is necessary in order to cancel out errors caused by fluctuations in the amplitude of signal B and the balanced circuit of the present invention is possible of quick and accurate tuning for the two signals by means of non-interacting tuning inductors. When the balanced phase detector is employed in a moving target indication radar system, the echo signal may be passed through a limiter stage before application to input A so that there will be no variations in the amplitude of signal A to interfere with accurate indication of phase differences.

A second embodiment of the invention shown in Figure 2 differs from that in Figure 1 in that B plus voltage is applied to the plates of tubes 16 and 18 through a load resistor 52 and equal load resistors 53 and 54. The plates are connected through coupling condensers 55 and 56 to an A-signal tuning inductor 57. A B-signal tuning inductor 58 is connected from the centertap 59 of inductor 57 to ground. In other respects the embodiment shown in Figure 2 is the same as that shown in Figure 1. The plate current due to signal A flows in load resistor 52. The load resistors 53 and 54 carry plate currents resulting from both the A and B signals.

In operation, the output circuit is tuned for signal A by adjustment of inductor 57 and is tuned for signal B by adjustment of inductor 58. Because of the balanced arrangement of the circuit, the tuning for one signal does not affect the tuning for the other signal so that accurate adjustment of the circuit for maximum efficiency may be quickly made.

While two forms of the invention have been shown in detail and described, it is of course to be understood that this has been done for purposes of illustration and not by way of limitation. It is accordingly desired that the appended claims be given a broad interpretation commensurate with the scope of the invention within the art.

The invention described herein may be manufactured and used by or for the Government of the United States of America for governmental purposes without the payment of any royalties thereon or therefor.

What is claimed is:

1. A balanced phase detector comprising a pair of vacuum tubes having first input circuit means for applying a first signal thereto in push-pull and a second input circuit means for applying a second signal thereto in parallel, a first balanced, tunable output circuit for the first signal connected in push-pull to said tubes, a second tunable output circuit for the second signal coupled to said tubes in parallel including a tunable output inductance connected between the electrical center of said first circuit and an output terminal of said detector, said first circuit being adjustable for tuning to said first signal without effecting the tuning of said second circuit to the second signal, said second circuit being tunable to said second signal without effecting the tuning of said first circuit to said first signal, and a first rectifier, a center-tapped load resistor and a second rectifier connected in series in the order given across the outer terminals of said first circuit, the polarity of said rectifiers being such that the space current paths of said rectifiers are in the same direction in the series connection, the output of said detector being taken from between the center tap of said load resistor and said output terminal.

2. A balanced phase detector comprising a pair of vacuum tubes having first input circuit means for applying a first signal thereto in push-pull and a second input circuit means for applying a second signal thereto in parallel, a balanced tunable output transformer for the first signal having a primary winding connected in push-pull to said tubes, an output circuit for said second signal coupled to the tubes in parallel including a tunable output choke connected between the electrical center of the secondary winding of said transformer and an output terminal of said detector, said transformer being adjustable for tuning to said first signal without effecting the tuning of said choke to the second signal, said choke being tunable to said second signal without effecting the tuning of the transformer to said first signal, a first rectifier, a center-tapped load resistor and a second rectifier connected in series in the order given to the secondary of said transformer, the polarity of said rectifiers being such that the space current paths of said rectifiers are in the same direction in the series connection, the output of said detector being taken from between the center tap of said load resistor and said output terminal.

3. A balanced phase detector comprising a pair of vacuum tubes having first input circuit means for applying a first signal thereto in push-pull and a second input circuit means for applying a second signal thereto in parallel, a balanced tunable center-tapped output inductance for the first signal connected in push-pull to said tubes, an output circuit coupled to the tubes in parallel including a second tunable output inductance connected between the center tap of said center-tapped output inductance and an output terminal of said detector, said center-tapped inductance being adjustable for tuning to said first signal without effecting the tuning of said second inductance to said second signal, said second inductance being tunable to said second signal without effecting the tuning of said center-tapped inductance to said first signal, and a first rectifier, a center-tapped load resistor and a second rectifier connected in series in the order given across the outer terminals of said center-tapped choke, the polarity of said rectifiers being such that the space current paths of said rectifiers are in the same direction in the series connection, the output of said detector being taken between the center tap of said load resistor and said output terminals.

References Cited in the file of this patent

UNITED STATES PATENTS

| Number | Name | Date |
|---|---|---|
| 1,596,942 | Nyquist et al. | Aug. 24, 1926 |
| 1,809,839 | Field | June 16, 1931 |
| 2,093,512 | Bowen | Sept. 21, 1937 |
| 2,225,348 | Mikelson | Dec. 17, 1940 |
| 2,256,083 | George | Sept. 16, 1941 |
| 2,265,826 | Wheeler | Dec. 9, 1941 |
| 2,282,104 | Tunick | May 5, 1942 |
| 2,394,892 | Brown | Feb. 12, 1946 |
| 2,410,843 | Shepherd | Nov. 12, 1946 |
| 2,411,605 | Webb | Nov. 26, 1946 |
| 2,433,380 | Maddock | Dec. 30, 1947 |
| 2,457,207 | Carlson | Dec. 28, 1948 |
| 2,497,840 | Seeley | Feb. 14, 1950 |
| 2,509,389 | Blake | May 30, 1950 |
| 2,577,668 | Wilmotte | Dec. 4, 1951 |